UNITED STATES PATENT OFFICE.

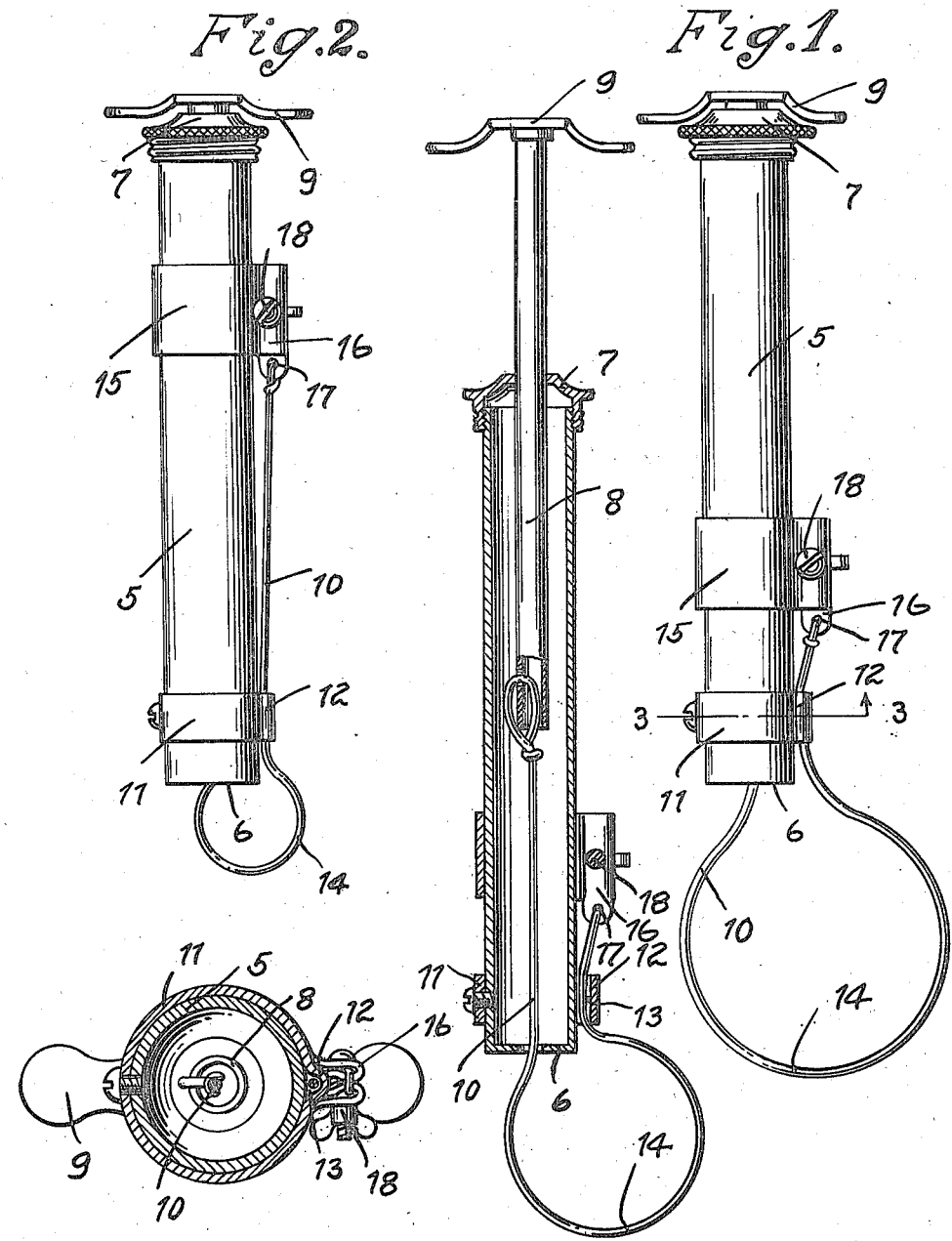

JOSEPH ANTHONY FURNSTAHL, OF HOWARD, SOUTH DAKOTA.

HOG CATCHING AND HOLDING DEVICE.

1,152,165.  Specification of Letters Patent.  Patented Aug. 31, 1915.

Application filed June 22, 1914. Serial No. 846,633.

*To all whom it may concern:*

Be it known that I, JOSEPH ANTHONY FURNSTAHL, a citizen of the United States, residing at Howard, in the county of Miner, State of South Dakota, have invented certain new and useful Improvements in Hog Catching and Holding Devices; and I do hereby declare the following to be a full, clear, and exact description of the invention, such as will enable others skilled in the art to which it appertains to make and use the same.

This invention relates to animal husbandry implements, particularly to hog catching and holding devices, and has for its object the provision of a novel device whereby hogs may be caught and securely held while ringing them.

An important object is the provision of a device of this character having novel means whereby the size of the catching loop may be quickly and easily varied.

Another object is the provision of a device of this character which may be used also for the subduing of vicious horses, in which event it is used as a nose or ear twister.

A further object is the provision of a device of this character which will be simple and inexpensive in manufacture, efficient and durable in service, positive in operation and a general improvement of the art.

With these and other objects and advantages in view, the invention consists in the novel construction and arrangement of parts to be hereinafter more fully described and claimed, and illustrated in the accompanying drawing in which—

Figure 1 is a side elevation of my novel device, Fig. 2 is a similar view showing the adjusting sleeve shifted for varying the size of the catching loop, Fig. 3 is a cross sectional view showing the guide and adjustable sleeve, and Fig. 4 is a view showing the operating handle pulled back for holding the animal.

Referring more particularly to the drawing the numeral 5 designates the main or body portion of my device, which is formed tubular, closed at one end by a head 6 and closed at its other end by a removable cap 7 provided with a central aperture. Extending within the member 5 through the apertured cap 7 is an operating rod 8 provided upon its outer end with a transversely extending handle 9. A cord or wire 10 has one end secured to the inner end of the rod 8 and extends outwardly through the head 6, then through a rigid guide member 11 secured upon the forward end of the member 5 and comprising an annular ring 12 bent to form a channel 13 through which the wire 10 extends. In order to secure the other end of the wire 10 and to hold it in adjusted positions for varying the size of the loop 14 formed in the wire, I provide a sleeve 15 slidable upon the member 5 and provided with ears 16 having a hole 17 formed therein for the attachment of the wire. The position of the sleeve 15 may be varied longitudinally upon the member 5 by sliding it to the desired position and then clamping it in place by a clamping screw 18 passing through the ears 16.

In using my device for ringing hogs, it is merely necessary to catch the loop 14 around the snout of the hog and then pull rearwardly upon the handle 9 which will cause the loop 14 to be constricted tightly around the snout of the animal. If the loop does not grip with sufficient tightness it is merely necessary to move the sleeve 15 rearwardly upon the member 5 so that the length of wire between the end of the rod 8 and the guide member 11 will be shortened, whereby a tighter loop will be obtained. If a looser loop is desired, the reverse operation is gone through with.

It will of course be understood that the device may be used for catching and holding hogs or other small animals by the legs for treating them in any desired manner. It will also be noted that the loop 14 may be readily adjusted so that it may be engaged upon the nose or ear of a horse, thus enabling the device to be used as a twister for subduing refractory horses.

From the foregoing description and a study of the drawing, it will be apparent that I have thus provided a simple and novel device for catching hogs or other animals by the nose, ear or foot so that they may be treated in any desired manner.

It will be readily understood that I reserve the right to make various changes in the form, construction and arrangement of parts without departing from the spirit of the invention or limiting the scope of the subjoined claim.

Having thus described my invention, I claim:

An animal holding device comprising a tubular member, a plunger rod mounted therein and provided at one end with a handle, a guide ring secured to and encircling the forward end of said member, a flexible cord having one end extended within the tubular member and connected with the rod, and its other end looped and inserted through said guide ring, and a clamping sleeve adjustably engaged on said tubular member and connected with the last mentioned end of the cord whereby the diameter of the loop may be varied.

In testimony whereof I affix my signature, in the presence of two witnesses.

JOSEPH ANTHONY FUERNSTAHL.

Witnesses:
G. E. HANSON,
J. B. ADKINS.